United States Patent
Bian et al.

(10) Patent No.: US 8,740,401 B2
(45) Date of Patent: Jun. 3, 2014

(54) HOUSING AND ELECTRONIC DEVICE USING THE SAME

(75) Inventors: Xiao-She Bian, Shenzhen (CN); Bai-Da Yu, Shenzhen (CN); Guang-Liang Chen, Shenzhen (CN); Ke Zhang, Shenzhen (CN); Lian-Meng Zhao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 12/965,848

(22) Filed: Dec. 11, 2010

(65) Prior Publication Data

US 2011/0235345 A1 Sep. 29, 2011

(30) Foreign Application Priority Data

Mar. 29, 2010 (CN) .......................... 2010 1 0134637

(51) Int. Cl.
*H04M 1/22* (2006.01)
*H04M 1/00* (2006.01)
*G08B 5/00* (2006.01)

(52) U.S. Cl.
USPC ......... 362/86; 362/88; 455/575.1; 455/575.8; 340/815.42; 340/815.73

(58) Field of Classification Search
USPC .................... 362/86, 88; 340/815.42, 815.45, 340/815.49, 815.5, 815.55–815.57, 340/815.73–815.77; 455/575.8, 575.1
See application file for complete search history.

(56) References Cited

U.S. PATENT DOCUMENTS

| | | | |
|---|---|---|---|
| 7,336,980 B1 * | 2/2008 | Kaikuranta et al. | ....... 455/575.6 |
| 7,583,429 B2 * | 9/2009 | Gally et al. | .................... 359/260 |
| 7,891,828 B2 * | 2/2011 | Nakamura | ...................... 362/23 |
| 8,527,020 B2 * | 9/2013 | Tho et al. | ................... 455/575.1 |
| 2001/0018332 A1 * | 8/2001 | Lustila et al. | ................... 455/90 |
| 2007/0032258 A1 * | 2/2007 | Yamada et al. | ............ 455/550.1 |
| 2007/0109794 A1 * | 5/2007 | Keller et al. | .................. 362/362 |
| 2008/0192500 A1 * | 8/2008 | Kaito | ............................ 362/603 |
| 2009/0207631 A1 * | 8/2009 | Isoda | ............................ 362/619 |
| 2010/0320882 A1 * | 12/2010 | Zhang | .......................... 312/204 |
| 2011/0228554 A1 * | 9/2011 | Watanabe et al. | ............. 362/558 |
| 2012/0302294 A1 * | 11/2012 | Hammond et al. | ........... 455/567 |

FOREIGN PATENT DOCUMENTS

| | | |
|---|---|---|
| CN | 101472418 A | 7/2009 |
| CN | 101573004 A | 11/2009 |
| JP | 200385521 A | 3/2003 |
| TW | 201008437 A | 2/2010 |
| TW | I314899 A | 1/2014 |

* cited by examiner

*Primary Examiner* — David J Makiya
(74) *Attorney, Agent, or Firm* — Novak Druce Connolly Bove + Quigg LLP

(57) ABSTRACT

A housing for an electronic device includes a ceramic patterned light transmitting portion and a ceramic light resistant portion surrounding the light transmitting portion. A thickness of the light transmitting portion is in a range from 0.2 mm to 1 mm. A thickness of the light resistant portion is at least 0.3 mm thicker than that of the light transmitting portion.

12 Claims, 6 Drawing Sheets

HOUSING AND ELECTRONIC DEVICE USING THE SAME

BACKGROUND

1. Technical Field

The present disclosure relates generally to device housings, and especially to a housing for an electronic device.

2. Description of Related Art

Commonly used housings for an electronic device often includes manufacturer and identifying graphics on an outer surface thereon. However, the normally printed graphics are easily peeled off or abraded away.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
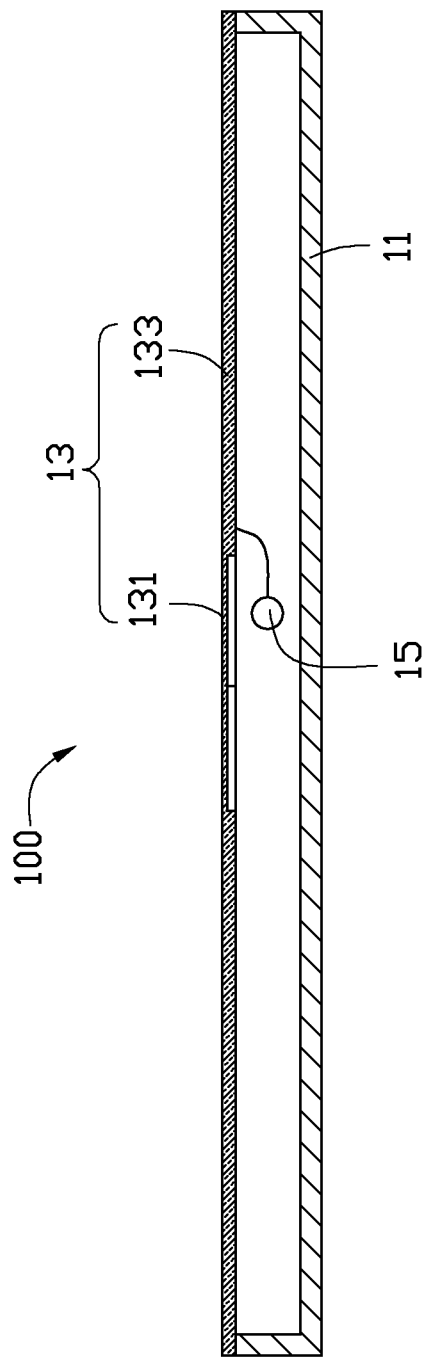
FIG. 1 is a cross section of an embodiment of an electronic device, in which the electronic device includes a housing.

Referring to FIG. 1, an embodiment of an electronic device 100 includes a main body 11, a housing 13 covering on the main body 11 and a light source 15 positioned in the main body 11. The housing 13 is ceramic material. The housing 13 includes a ceramic light transmitting portion 131 and a ceramic light resistant portion 133 surrounding the light transmitting portion 131. The light source 15 faces the light transmitting portion 131, and supplies light for the light transmitting portion 131. In the illustrated embodiment, the electronic device 100 is a cell phone, and the light source 15 is a light emitting diode, although the electronic device 100 may alternatively be a music player or a personal digital assistant.

Figure 2:
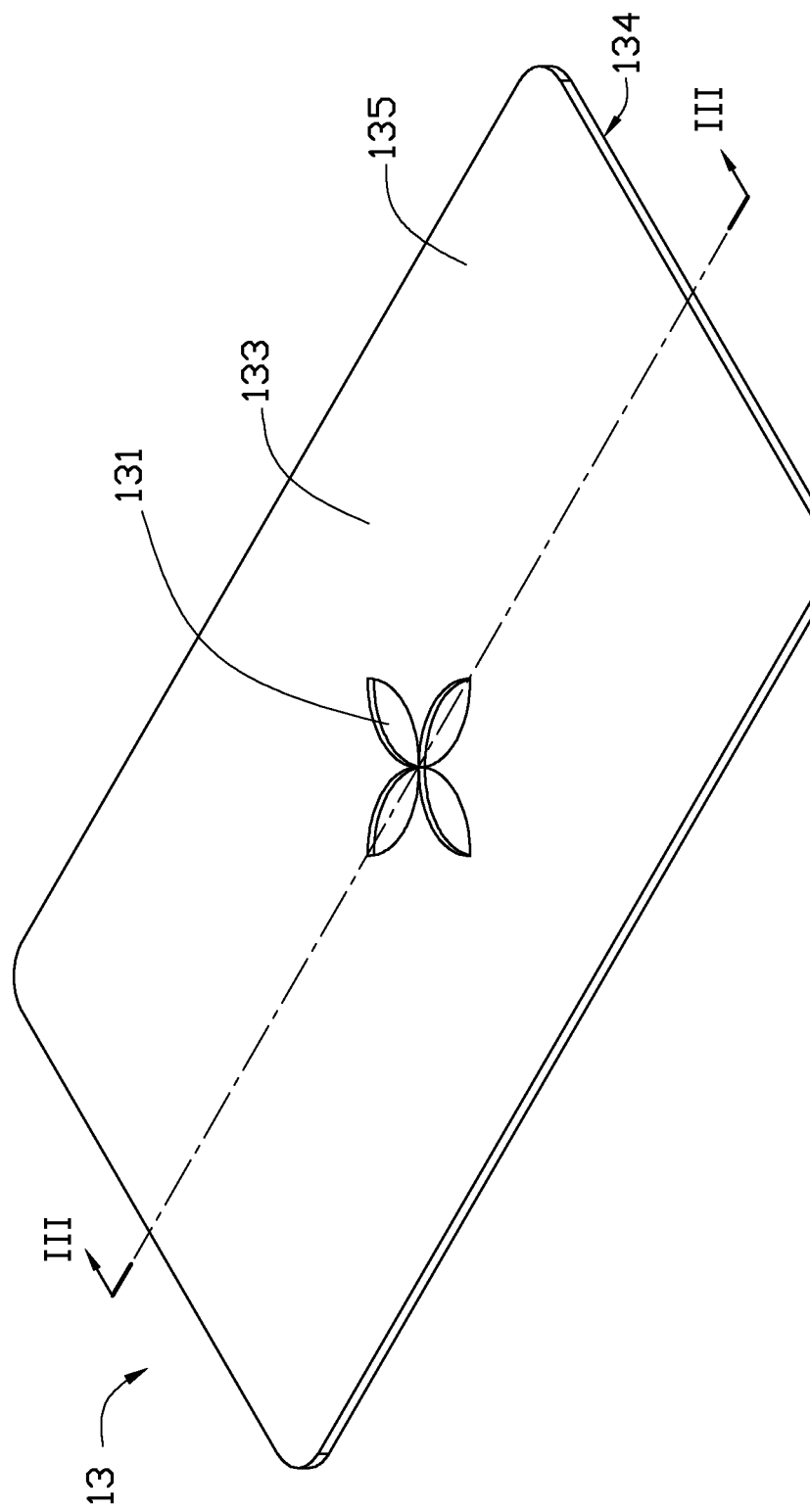
FIG. 2 is an isometric view of the housing shown in FIG. 1, showing the housing inverted.
Figure 3:
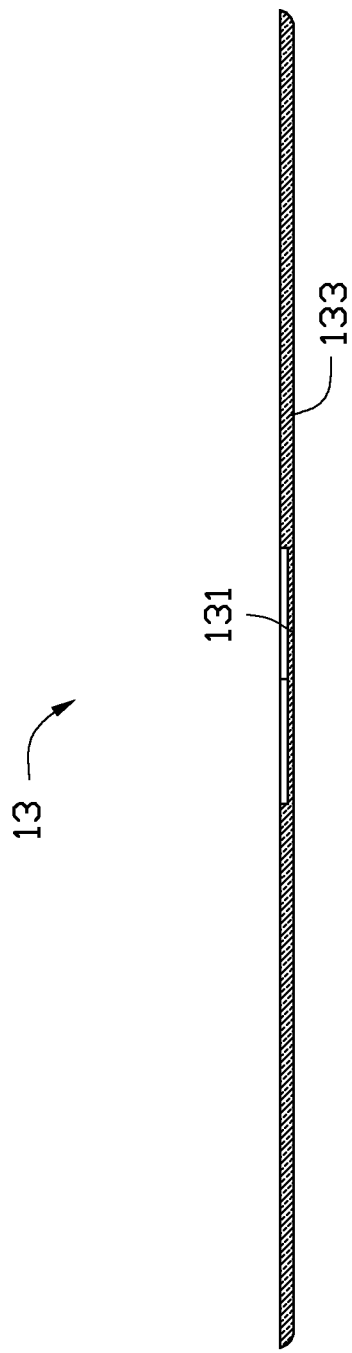
FIG. 3 is a cross section of the housing shown in FIG. 2, taken along the line III-III.

Also referring to FIGS. 2 and 3, the housing 13 is rectangular in shape. The light transmitting portion 131 is formed in an inner surface 135 of the housing 13. The light transmitting portion 131 is patterned in the illustrated embodiment, and forms a decorative pattern. Alternatively, the light transmitting portion 131 may form a specific graphic design pattern. A thickness of the light transmitting portion 131 is in a range from 0.2 mm to 1 mm, such that light can easily transmit therethrough, and the light transmitting portion 131 would not be easily broken. The light resistant portion 133 is at least 0.3 mm thicker than the light transmitting portion 131, thus most of the light can be blocked. The thickness of the light transmitting portion 131 is preferably from 0.3 mm to 0.6 mm. The thickness of the light resistant portion 133 is larger than 1.4 mm, to enhance the physical strength of the housing 13. In the illustrated embodiment, the thickness of the light transmitting portion 131 is 0.5 mm, and the thickness of the light resistant portion 133 is 1.5 mm.

A light transmission ratio of the light transmitting portion 131 is greater than that of the light resistant portion 133 due to the difference in thickness, such that the light from the light source 15 partially passes through the light resisting portion 133 and the pattern can be seen more clearly. Since the light transmitting portion 131 is formed in the inner surface 135 of the housing 13, dust or other contaminants outside is/are prevented from adhering on the light transmitting portion 131. Alternatively, the light transmitting portion 131 can be formed in an outer surface 134 of the housing 13. The pattern can be clearly seen, even after long usage.

It should be noted that the light transmitting portion 131 and the light resistant portion 133 may be made of other ceramic material having different light transmission ratio, for example, the light transmitting portion 131 can be alumina with higher light transmission ratio, and the light resistant portion 133 can be zirconia with lower light transmission ratio than alumina, to as to ensure that the pattern is highly visible.

Figure 4:
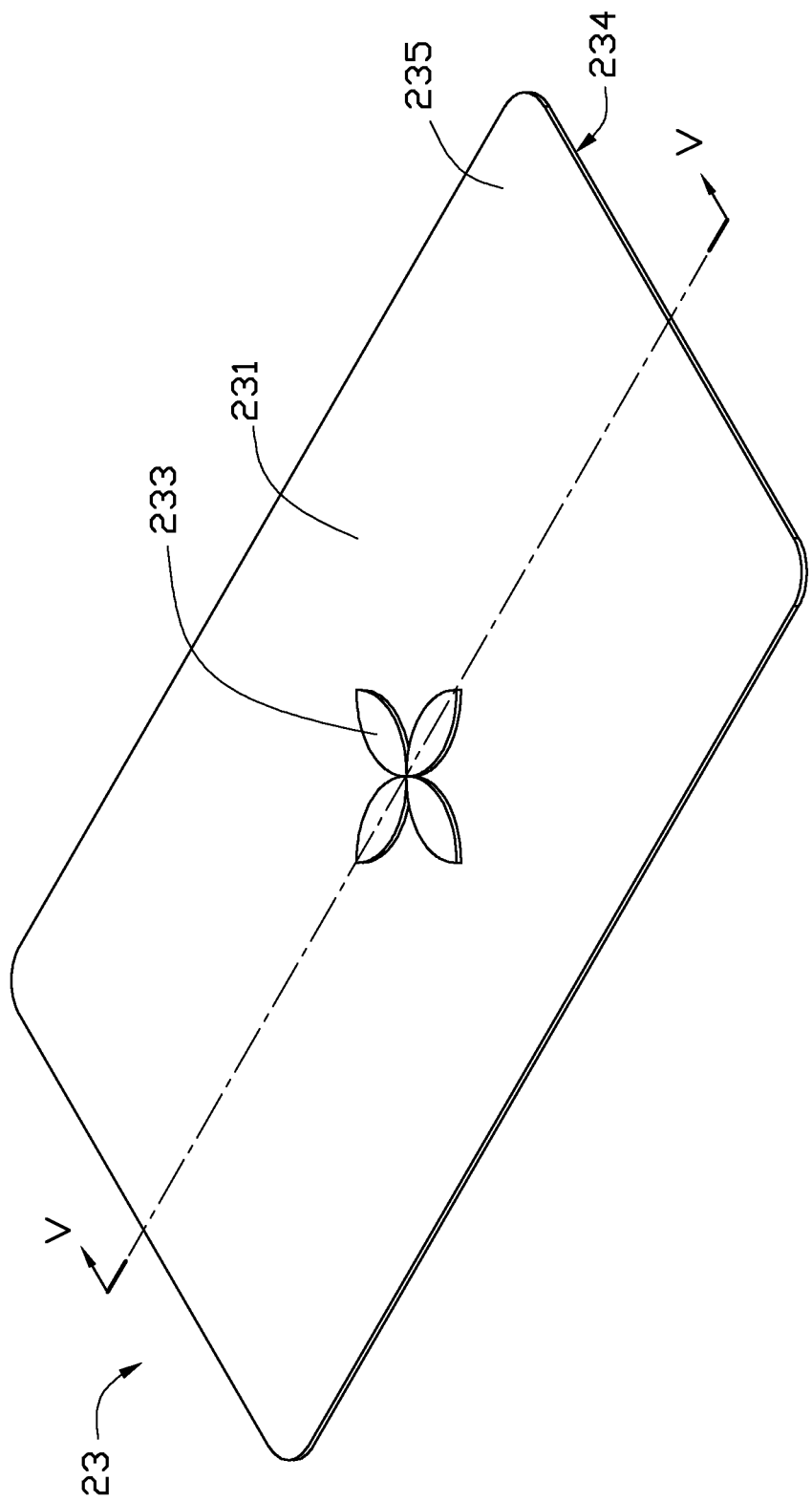
FIG. 4 is similar to FIG. 2, but showing a housing of another embodiment of an electronic device, the housing including a light resistant portion patterned on an inner surface thereof.
Figure 5:
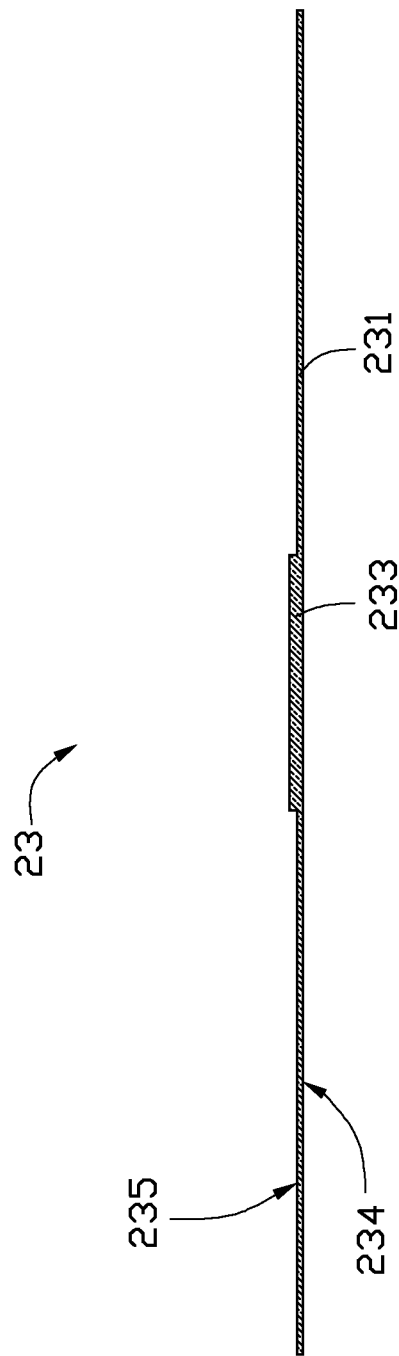
FIG. 5 is a cross section of the housing shown in FIG. 4, taken along the line V-V.
Figure 6:
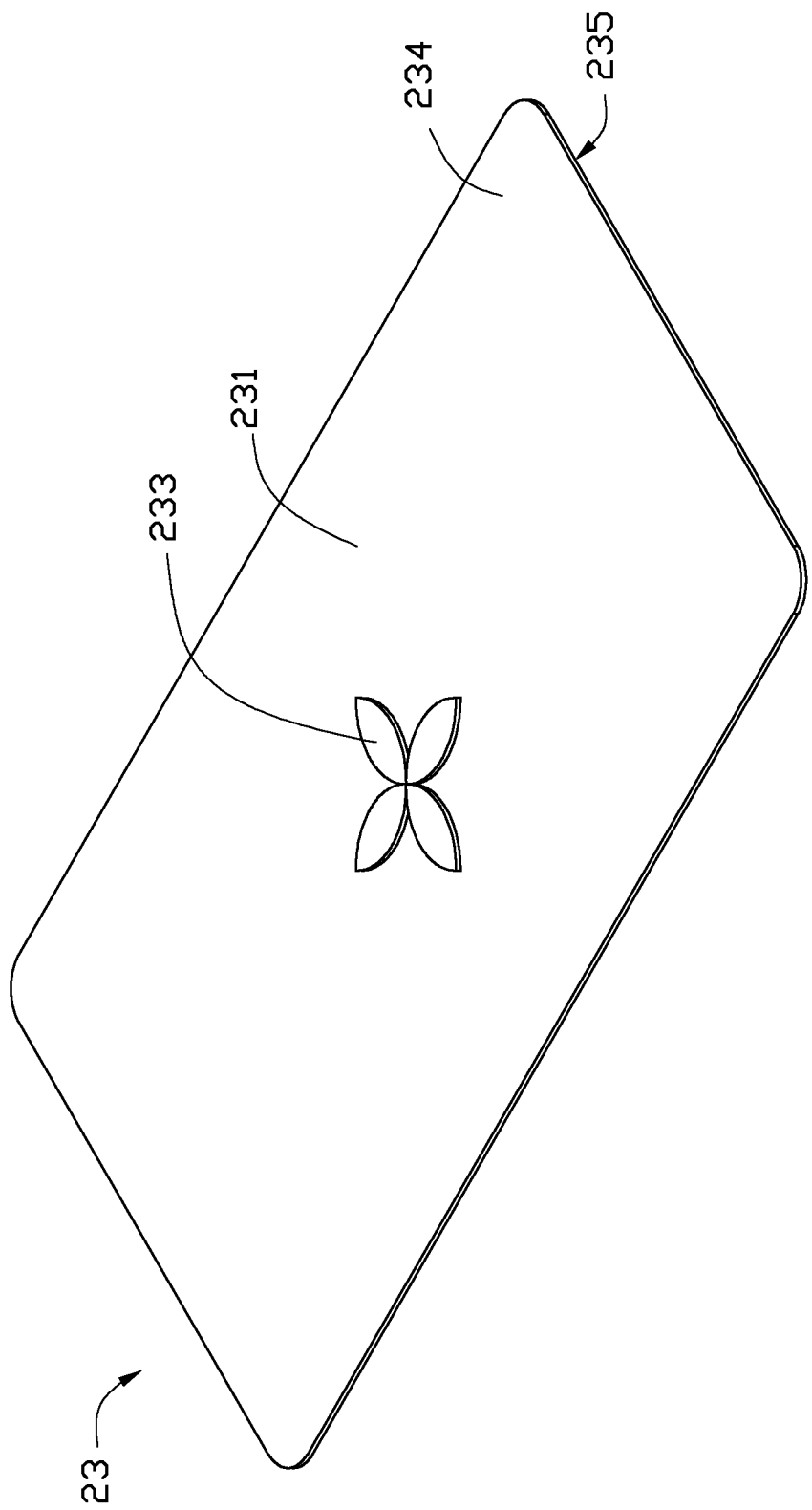
FIG. 6 is similar to FIG. 4, but showing an alternative embodiment wherein the housing includes the light resistant portion patterned on an outer surface thereof.

It should be noted that in an alternative embodiment, the light resistant portion 133 may be patterned, and be surrounded by the light transmitting portion 131. Referring to FIGS. 4 and 5, in one example, a light resistant portion 233 is patterned on an inner surface 235 of a housing 23. When a corresponding light source (similar to the light source 15 described above) is turned on, the pattern of the light resistant portion 233 is darker than that of a light transmitting portion 231 surrounding the light resistant portion 233, but nevertheless is still visible. Alternatively, referring to FIG. 6, the light resistant portion 233 can be patterned on an outer surface 234 of the housing 23.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A housing for an electronic device, comprising:
   a light transmitting portion; and
   a ceramic light resistant portion having a lower light transmission ratio than the light transmitting portion for partially transmitting a light;
   wherein the light resistant portion is patterned, the light transmitting portion surrounding the light resistant portion, a thickness of the light transmitting portion being in a range from 0.2 mm to 1 mm, and a thickness of the light resistant portion being at least 0.3 mm greater than the thickness of the light transmitting portion.

2. The housing of claim 1, wherein the thickness of the light transmitting portion is in a range from 0.3 mm to 0.6 mm.

3. The housing of claim 1, wherein the thickness of the light resistant portion is greater than 1.4 mm.

4. The housing of claim 1, wherein the light resistant portion is patterned on an inner surface of the housing.

5. The housing of claim 1, wherein the light resistant portion is patterned on an outer surface of the housing.

6. An electronic device comprising:
   a main body;
   a light source; and
   a housing for receiving the main body;
   wherein the housing comprises a ceramic light resistant portion and a light transmitting portion surrounding the light resistant portion, the light resistant portion is patterned, a light transmission ratio of the light transmitting portion is greater than a light transmission ratio of the light resistant portion, a light from the light source partially passes through the light resistant portion, a thickness of the light transmitting portion is in a range from 0.2 mm to 1 mm, a thickness of the light resistant portion is at least 0.3 mm greater than the thickness of the light transmitting portion, and the light source is positioned in the main body to supply the light for the light transmitting portion.

7. The electronic device of claim 6, wherein the light source faces the light transmitting portion.

8. The electronic device of claim 6, wherein the light source is a light emitting diode.

9. The electronic device of claim 6, wherein the thickness of the light transmitting portion is in a range from 0.3 mm to 0.6 mm.

10. The electronic device of claim 6, wherein the thickness of the light resistant portion is greater than 1.4 mm.

11. The electronic device of claim 6, wherein the light resistant portion is patterned on an inner surface of the housing.

12. The electronic device of claim 6, wherein the light resistant portion is patterned on an outer surface of the housing.

* * * * *